Jan. 31, 1939.   E. STAFFORD   2,145,323
DEFROSTING AND REFREEZING APPARATUS
Filed July 28, 1937
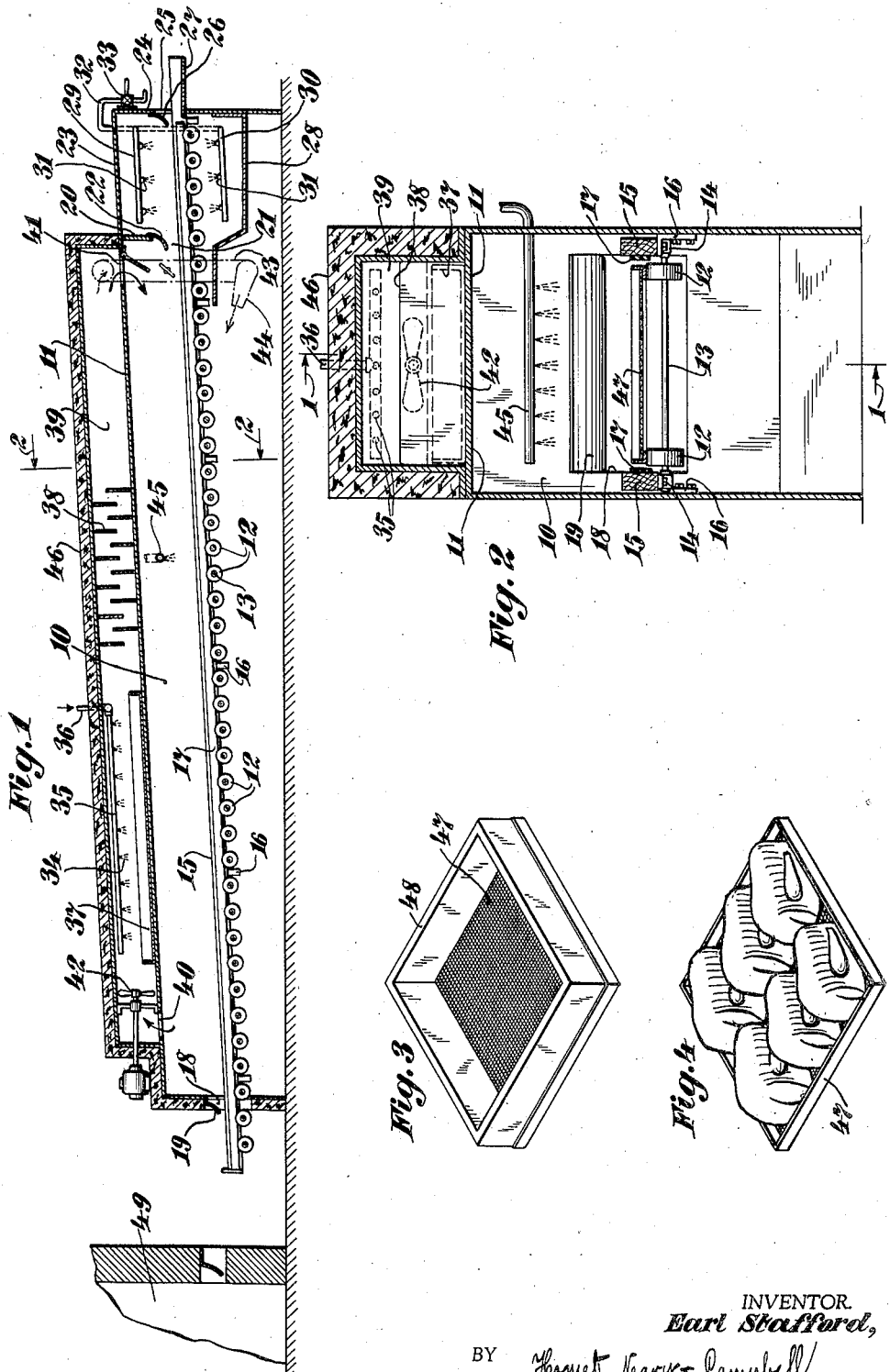
INVENTOR.
Earl Stafford,
BY Hoguet, Neary & Campbell,
HIS ATTORNEYS Patented Jan. 31, 1939

2,145,323

UNITED STATES PATENT OFFICE 2,145,323

DEFROSTING AND REFREEZING APPARATUS

Earl Stafford, North Reading, Mass., assignor to Z Pack Corporation, Jersey City, N. J., a corporation of Delaware Application July 28, 1937, Serial No. 156,050

14 Claims. (Cl. 62—104)

This invention relates to the freezing of food products and embodies, more specifically, a mechanism by means of which an operation may be carried out on food products subsequent to the freezing of the products. In other words, it may be said that the device of the present invention serves to provide a finishing operation upon frozen products. The specific finishing operations carried out by means of the present invention are defrosting and re-freezing operations by means of which the physical properties of the frozen product may be improved.

As described in the co-pending application of Mikail T. Zarotschenzeff, Serial No. 82,517, filed May 29, 1936, for "Process of quick frozen products to enhance the appearance thereof", there is described a process by means of which the natural bloom is restored to fowl and other food products which have been quick frozen. Moreover, in the copending application of Mikail T. Zarotschenzeff, Serial No. 1,851, filed January 15, 1935, for "Frame freezing", there is described a method and apparatus by means of which food products may be racked into a desired shape and subsequently quick frozen while maintained in such shape in order to provide a frozen product which may be handled with facility. The present invention relates in part to each of the inventions described in the foregoing co-pending applications and provides a mechanism by means of which finishing operations may be effected on frozen food products, the invention being particularly suitable for use where the food products have been frozen in a frame, as above referred to, although this invention is not limited to either in connection with frame frozen food products.

In order that the defrosting and re-freezing operations above referred to may be effectively carried out, the present invention has beeen designed and an object of the invention is to provide an apparatus wherein the defrosting and re-freezing operations may be effected under such conditions as to most effectively and efficiently carry out defrosting and re-freezing operations.

A further object of the invention is to provide an apparatus wherein the defrosting and re-freezing operations may be effected with a minimum amount of manual supervision.

A further object of the invention is to provide a device of the above character wherein the defrosting and re-freezing operations may be carried out automatically, the attendant simply introducing the food products into the mechanism and removing the same therefrom.

A further object of the invention is to provide a mechanism of the above character wherein a defrosting medium is effectively applied to substantially the entire surface of food products after which the products are automatically subjected to a re-freezing operation.

A further object of the invention is to provide a relatively simple and effective mechanism by means of which the defrosting, re-freezing and glazing operations may be effectively carried out.

Further objects of the invention will be apparent as it is described in greater detail in connection with the accompanying drawing wherein.

Figure 1 is a view in longitudinal section, taken on line 1—1 of Figure 2 and looking in the direction of the arrows. This view illustrates a defrosting and re-freezing mechanism as constructed in accordance with the present invention.

Figure 2 is a view in transverse section taken on line 2—2 of Figure 1 and looking in the direction of the arrows.

Figure 3 is a perspective view of a freezing frame in which food products may be frozen in accordance with applicant's co-pending application Serial No. 1,851, above referred to.

Figure 4 is a perspective view of a supporting screen upon which food products may be supported during the freezing operation and while positioned by means of the freezing frame shown in Figure 3.

With reference to the above drawing, a freezing chamber is shown at 10, being formed by an elongated housing or tunnel 11 through which a suitable conveyor extends. In the form of the invention here illustrated, the conveyor is shown as being formed of a plurality of pairs of longitudinally spaced rollers 12, the rollers of each pair being mounted on a shaft 13 which is journaled at 14 on longitudinal stringers 15 which may be secured to the side walls of the housing or tunnel 11 by means of brackets 16. In order to facilitate movement of the food products through the tunnel, the stringers 15 slope at a desired incline from the loading station shown at the right of Figure 1 to the discharge station shown at the left of Figure 1. Longitudinal buffer strips 17 of rubber or other suitable material are provided on the inner sides of the stringers 15 and the discharge end of the tunnel or housing 11 is provided with an opening 18 through which the food products are discharged. This opening is preferably closed by means of a flap or the like, 19, in order to avoid loss of the refrigerating medium from the tunnel. The front end of the tunnel 11 is provided with a transverse bulkhead 20 having an opening 21 formed therein, the opening being closed by means of a flap 22. Forwardly of the bulkhead 20, the tunnel is continued to form a defrosting chamber 23, closed at its forward extremity by an end wall 24 having an opening 25 and a flap 26 to close the same. A table 27 between the extending ends of the stringers 15 is provided to enable the products to be treated to be placed thereon and facilitate the introduction thereof into the defrosting chamber.

The defrosting chamber 23 is provided with a bottom 28 and has positioned therein, upper and lower spray headers 29 and 30. Each header is provided with a plurality of spray nozzles 31 and the header communicates with a pipe 32 through which a suitable defrosting medium such as, for example, fresh water, may be supplied under pressure. An automatic control valve 33 is provided in the pipe 32, the valve being of a common type by means of which a predetermined amount of defrosting medium is introduced into the headers 29 and 30. After the predetermined amount has been supplied, the valve 33 automatically closes. By means of this construction, the defrosting medium is supplied from above and below upon the food products presented within the defrosting chamber 23.

The defrosting operation should take place in such fashion as to cause the defrosting of the food products to penetrate the surface portion only thereof and not penetrate substantially therebeyond. For example, in treating fowl, the defrosting of the skin only should be effected, the purpose thereof being to enhance the appearance of the frozen bird. If the defrosting operation is properly controlled, under certain conditions it may be desirable to permit the product to re-freeze from within.

The re-freezing and glazing operation is carried out in the chamber 10 by introducing into this chamber a convection freezing medium such as air, this air being cooled by means of brine sprays 34, sprayed from one or more headers 35 through a spray pipe 36. A pan 37 is provided beneath the sprays 34 and eliminator baffles 38 are formed in the auxiliary chamber 39. The auxiliary chamber 39 is preferably positioned above the tunnel 11 as shown in Figure 1, and communicates with the chamber 10 in the tunnel 11 through openings 40 and 41. A fan 42 at one end of the chamber 39 causes a circulation of air between the chambers 10 and 39, as indicated by the arrows in Figure 1. This cold air serves to re-freeze the food products on the conveyor and glaze the same by freezing the coating of moisture remaining on the food products from the defrosting chamber 23. The air is preferably circulated above and below the conveyor by directing the same through the opening 41 and also through a conduit 43 which communicates with the chamber 39 and is provided with a discharge outlet 44 beneath the conveyor.

If desired, an additional or further glaze may be applied to the food products by providing a header 45 by means of which ice water may be sprayed downwardly over the food products as illustrated in Figures 1 and 2. Economy of operation of the device is improved by providing insulation 46 over the chambers 10 and 39.

In operation, if the products which are removed from a suitable freezing apparatus are framed and placed upon a screen, as shown in Figure 4, the frames 47 (Figure 3) may be removed and the products introduced at the right hand end of the device as shown in Figure 1. As additional frames, screens, or other supporting devices are inserted at the entrance and through opening 25, food product supporting devices are advanced through the device to perfect the operations above described. The products may then be placed in a storage chamber 49, shown in Figure 1. Obviously, if the products are of such nature, supporting devices may be eliminated and the products advanced through the mechanism without such supports.

It will thus be seen that an effective mechanism has been provided by means of which defrosting and re-freezing operations may be effected in a substantially automatic and efficient manner. The proportions of the mechanism may be varied to secure such results as are desired and the invention is not to be limited save as defined in the appended claims.

I claim:

1. Apparatus for treating frozen food products comprising chamber forming means having entrance and discharge means at opposite ends thereof, means to support food products as they are directed through the chamber, means at the entrance to direct a spray of a defrosting medium upon food products on the supporting means, and means between the defrosting means and the discharge means to enable the defrosted portion of the food products to be re-frozen.

2. Apparatus for treating frozen food products comprising chamber forming means having entrance and discharge means at opposite ends thereof, means to support food products as they are directed through the chamber, means at the entrance to direct a spray of a defrosting medium upon food products on the supporting means, and means between the defrosting means and the discharge means to subject the food products to a convection freezing medium to refreeze the products.

3. Apparatus for treating frozen food products comprising chamber forming means having entrance and discharge means at opposite ends thereof, means to support food products as they are directed through the chamber, means at the entrance to direct sprays of a defrosting medium from above and below upon food products on the supporting means, and means between the defrosting means and the discharge means to subject the food products to a re-freezing medium.

4. Apparatus for treating frozen food products comprising chamber forming means having entrance and discharge means at opposite ends thereof, means to support food products as they are directed through the chamber, means at the entrance to direct sprays of a defrosting medium from above and below upon food products on the supporting means, and means between the last named means and the discharge means to subject all sides of the food products to a re-freezing medium.

5. Apparatus for treating frozen food products comprising chamber forming means having entrance and discharge means at opposite ends thereof, means to support food products as they are directed through the chamber, means at the entrance to direct a spray of a defrosting medium upon food products on the supporting means, means to deliver predetermined amounts of defrosting fluid to the spray means, and means between the defrosting means and the discharge means to subject the food products to a re-freezing medium.

6. Apparatus for treating frozen food products comprising chamber forming means having entrance and discharge means at opposite ends thereof, means to support food products as they are directed through the chamber, means at the entrance to direct a spray of a defrosting medium upon food products on the supporting means, manually operable mechanism to deliver predetermined amounts of defrosting fluid to the spray means, and means between the defrosting means and the discharge means to subject the food products to a re-freezing medium.

7. Apparatus for treating frozen food products comprising chamber forming means having entrance and discharge means at opposite ends thereof, means to support food products as they are directed through the chamber, means at the entrance to direct a spray of a defrosting medium upon food products on the supporting means, means between the defrosting means and the discharge means to subject the food products to a re-freezing medium, a chamber above the chamber forming means, heat interchange mechanism in the last named chamber, and means to circulate a convection cooling medium between the two chambers.

8. Apparatus for treating frozen food products comprising chamber forming means having entrance and discharge means at opposite ends thereof, means to support food products as they are directed through the chamber, means at the entrance to direct a spray of a defrosting medium upon food products on the supporting means, means between the defrosting means and the discharge means to subject the food products to a re-freezing medium, a chamber above the chamber forming means, a plurality of means to spray brine into the last named chamber, means to circulate a convection cooling medium between the two chambers, and means in the said last named chamber to eliminate the brine from the convection cooling medium.

9. Apparatus for treating frozen food products comprising chamber forming means having entrance and discharge means at opposite ends thereof, a plurality of spaced pairs of rollers to support food products as they are directed through the chamber, means at the entrance to direct a spray of a defrosting medium upon food products on the supporting means, and means between the defrosting means and the discharge means to subject the food products to a re-freezing medium.

10. Apparatus for treating frozen food products comprising chamber forming means having entrance and discharge means at opposite ends thereof, a plurality of spaced pairs of rollers to support food products as they are directed through the chamber, guide means to position the food products on the rollers, means at the entrance to direct a spray of a defrosting medium upon food products on the supporting means, and means between the defrosting means and the discharge means to subject the food products to a re-freezing medium.

11. Apparatus for treating frozen food products comprising chamber forming means having entrance and discharge means at opposite ends thereof, a plurality of spaced pairs of rollers to support food products as they are directed through the chamber, guide members on opposite sides of the pairs of rollers to position the food products on the rollers, means at the entrance to direct a spray of a defrosting medium upon food products on the supporting means, and means between the defrosting means and the discharge means to subject the food products to a re-freezing medium.

12. Apparatus for treating frozen food products comprising chamber forming means having entrance and discharge means at opposite ends thereof, means to support food products as they are directed through the chamber, means at the entrance to direct a spray of a defrosting medium upon food products on the supporting means, and means between the defrosting means and the discharge means to subject the food products to a re-freezing medium, and means in the last named means for spraying a glaze forming medium on the food products being refrozen.

13. Apparatus for treating frozen food products comprising chamber forming means having entrance and discharge means at opposite ends thereof, a plurality of spaced pairs of rollers to support food products as they are directed through the chamber, guide means to position the food products on the rollers, foraminous means adapted to roll on the rollers and support food products thereon, means at the entrance to direct a spray of a defrosting medium upon food products on the supporting means, and means between the defrosting means and the discharge means to subject the food products to a re-freezing medium.

14. Apparatus for treating frozen food products comprising chamber forming means having entrance and discharge means, means to support food products as they are directed through the chamber, means adjacent the entrance to direct a spray of a defrosting medium upon food products on the supporting means, and means between the defrosting means and the discharge means to enable the defrosted portion of the food products to be re-frozen.

EARL STAFFORD.